United States Patent Office.

FRANK W. DE SPESSBOURG, OF PROVINCE OF NORMANDY, FRANCE.

Letters Patent No. 94,479, dated September 7, 1869.

IMPROVED PROCESS OF PREPARING GRAIN FOR MASHING.

The Schedule referred to in these Letters Patent and making part of the same.

*To whom it may concern:*

Be it known that I, FRANK W. DE SPESSBOURG, of the province of Normandy, in the Empire of France, have invented a new and improved Process of Disintegrating Grain previous to Mashing in Distilleries, of which the following is a full, clear, and exact description.

The nature of my invention consists in the thorough disintegration of the grain to be used for distillation, by treating it with chlorine and its oxidating-compounds, after the grinding and previous to or during the boiling of the meal in the mash-tub.

Corn-meal, or the meal of any grain, however finely ground preparatory to the mashing in the ordinary distilling-process, will not give up all its starch, and sometimes not more than three-fourths of it, when the meal is boiled in the mash-tub. Coarse particles of meal will be found nearly intact after the boiling. These particles always contain a certain amount of starch-globules, which cannot be reached by the hot water, and remain undissolved. That amount of starch is lost in the process, because it cannot be changed into sugar by the diastase of the malt, and consequently cannot be changed into alcohol by the yeast.

To avoid this loss, or at least to greatly reduce it, I have found it necessary to practise some disintegrating-process, to which the grain shall be submitted after the grinding, and previous to the boiling of the meal in the mash-tub, or to which it should be submitted during the boiling. The substances which I find to answer best as chemical disintegrators for this purpose, are chlorine and its oxidating-compounds.

$CaO,ClO+CaCl$: hypochlorite of lime; $NaO,ClO+NaCl$: hypochlorite of soda; $KO,ClO+KCl$: hypochlorite of potassa; $MgO,ClO+MgCl$: hypochlorite of magnesia; (commercially called chlorides of the above-named alkalies.)

The disintegrating of the meal may be attained either by soaking it in water weakly charged with chlorine, or with any one of the above-named chlorides, during from six to eighteen hours, or more, according to the temperature of the water, which may be from 40° to 120° Fahrenheit; (the higher the temperature, the shorter will be the steeping-time;) or the same object may be attained as well without steeping or soaking previously to the mashing, by using, in the mash-tub in which the meal is to be boiled, instead of ordinary water, water that has been charged with the required quantity of chlorine-gas, or any one of the above-named hypochlorites, and the boiling of the mash, as usual. In this latter mode, it is best not to boil the mash too fast. I find the result to be equal to that in the first process, if the heating and boiling have, together, lasted one hour.

In both methods of using the above-named chemical substances, I use from forty to fifty cubic feet of chlorine-gas to one hundred bushels of corn-meal; and, when I use one of the hypochlorites instead of the simple gas, I take such a quantity as by chemical equivalents will be found to correspond to the forty or fifty cubic feet of the chlorine-gas; but I do not confine myself to these quantities, and claim the use of said chemical substances for the above-said purpose exclusively. When using one of the hypochlorites, a quantity of sulphuric or chlorhydric acid has to be added to the mixture of the grain and the chemically-prepared water, so as to hasten the decomposition of the hypochlorite, and consequently the action of the chlorine on the meal; but the quantity of the acid thus to be added must be computed according to its own composition and equivalent and the composition and equivalent of the particular chloride, so that at the end of the reaction the alkali of the hypochlorite will all be neutralized, and there will be left a light acid reaction which is favorable to the fermentation. An alkaline reaction would be prejudicial.

What I claim as new, and desire to secure by Letters Patent, is—

The use of chlorine-gas, or any of its equivalents, the hypochlorites (commercially called chlorides) of lime, soda, potash, and magnesia, in whatever way produced, for the purpose of preparing (disintegrating) corn (maize) meal, or the meal of any other grain, by soaking it in an aqueous solution of any one of the above-said substances, preparatory to boiling it in the mash-tub; or, without previously soaking it, by treating the grain with any one of the said substances at a higher temperature in the mash-tub, while heating and boiling it, as above specified.

FRANK W. DE SPESSBOURG.

Witnesses:
 H. D. PECK,
 O. L. FISHER.